United States Patent
Jones et al.

(10) Patent No.: US 7,426,578 B2
(45) Date of Patent: Sep. 16, 2008

(54) SYSTEMS AND METHODS FOR SYNCHRONIZING DATA BETWEEN COMMUNICATION DEVICES IN A NETWORKED ENVIRONMENT

(75) Inventors: Dan Jones, Niwot, CO (US); Todd Vernon, Lafayette, CO (US); Jeffrey Kriese, Castle Rock, CO (US)

(73) Assignee: InterCall, Inc., Omaha, NE (US)

( * ) Notice: Subject to any disclaimer, the term of this patent is extended or adjusted under 35 U.S.C. 154(b) by 33 days.

(21) Appl. No.: 10/735,590

(22) Filed: Dec. 12, 2003

(65) Prior Publication Data

US 2005/0132074 A1 Jun. 16, 2005

(51) Int. Cl.
*G06F 15/16* (2006.01)
(52) U.S. Cl. .................. 709/248; 709/228
(58) Field of Classification Search ......... 709/248, 709/228
See application file for complete search history.

(56) References Cited

U.S. PATENT DOCUMENTS

| | | | |
|---|---|---|---|
| 5,440,699 A | 8/1995 | Farrand et al. | |
| 5,530,795 A | 6/1996 | Wan | |
| 5,559,875 A | 9/1996 | Bieselin et al. | |
| 5,583,993 A | 12/1996 | Foster et al. | |
| 5,608,426 A | 3/1997 | Hester | |
| 5,608,872 A | 3/1997 | Schwartz et al. | |
| 5,623,603 A | 4/1997 | Jiang et al. | |
| 5,634,018 A | 5/1997 | Tanikoshi et al. | |
| 5,649,104 A | 7/1997 | Carleton et al. | |
| 5,706,502 A | 1/1998 | Foley et al. | |
| 5,742,670 A | 4/1998 | Bennett | |
| 5,745,711 A | 4/1998 | Kitahara et al. | |
| 5,748,898 A | 5/1998 | Ueda | |
| 5,754,830 A | 5/1998 | Butts et al. | |
| 5,761,419 A | 6/1998 | Schwartz et al. | |
| 5,764,901 A | 6/1998 | Skarbo et al. | |
| 5,778,368 A | 7/1998 | Hogan et al. | |
| 5,781,909 A | 7/1998 | Logan et al. | |
| 5,786,814 A | 7/1998 | Moran et al. | |
| 5,809,247 A | 9/1998 | Richardson et al. | |
| 5,809,250 A | 9/1998 | Kisor | |
| 5,819,243 A | 10/1998 | Rich et al. | |
| 5,844,979 A | 12/1998 | Raniere et al. | |

(Continued)

FOREIGN PATENT DOCUMENTS

DE 19717167 A1 10/1998

(Continued)

OTHER PUBLICATIONS

Odlyzko, P., et al., "Variable Rate Block Encoding and Adaptive Latency Control for Packet Voice Communications," Motorola Technical Developments, Motorola Inc. pp. 23:48-55 (1994).

(Continued)

*Primary Examiner*—William C. Vaughn, Jr.
*Assistant Examiner*—Ranodhi N Serrao (57) ABSTRACT

A source communication device comprises a cluster manager to group destination device connections into a plurality of performance clusters. The cluster manager then causes a synchronization mechanism to be generated for each performance cluster. Each synchronization cluster can then allow data to be optimally shared between the source device and destination devices within a given cluster.

72 Claims, 4 Drawing Sheets

U.S. PATENT DOCUMENTS

| | | | |
|---|---|---|---|
| 5,859,974 A | 1/1999 | McArdle et al. | |
| 5,894,556 A | 4/1999 | Grimm et al. | |
| 5,907,324 A | 5/1999 | Larson et al. | |
| 5,916,302 A | 6/1999 | Dunn et al. | |
| 5,930,238 A | 7/1999 | Nguyen | |
| 5,930,473 A | 7/1999 | Teng et al. | |
| 5,933,417 A | 8/1999 | Rottoo | |
| 5,940,082 A | 8/1999 | Brinegar et al. | |
| 5,944,791 A | 8/1999 | Scherpbier | |
| 5,951,652 A | 9/1999 | Ingrassia, Jr. et al. | |
| 5,953,506 A | 9/1999 | Kalra et al. | |
| 5,978,835 A | 11/1999 | Ludwig et al. | |
| 5,991,276 A | 11/1999 | Yamamoto | |
| 5,991,796 A | 11/1999 | Anupam et al. | |
| 5,995,606 A | 11/1999 | Civanlar et al. | |
| 5,995,951 A | 11/1999 | Ferguson | |
| 6,018,774 A | 1/2000 | Mayle et al. | |
| 6,038,651 A * | 3/2000 | VanHuben et al. | 712/21 |
| 6,047,323 A * | 4/2000 | Krause | 709/227 |
| 6,049,602 A | 4/2000 | Foladare et al. | |
| 6,061,440 A | 5/2000 | Delaney et al. | |
| 6,061,717 A | 5/2000 | Carleton et al. | |
| 6,072,463 A | 6/2000 | Glaser | |
| 6,104,392 A * | 8/2000 | Shaw et al. | 715/749 |
| 6,105,083 A * | 8/2000 | Kurtze et al. | 710/29 |
| 6,151,621 A | 11/2000 | Colyer et al. | |
| 6,151,688 A * | 11/2000 | Wipfel et al. | 714/48 |
| 6,157,401 A | 12/2000 | Wiryaman | |
| 6,192,394 B1 | 2/2001 | Gutfreund et al. | |
| 6,199,169 B1 * | 3/2001 | Voth | 713/400 |
| 6,237,025 B1 | 5/2001 | Ludwig et al. | |
| 6,240,444 B1 | 5/2001 | Fin et al. | |
| 6,263,361 B1 * | 7/2001 | Hoyer et al. | 709/203 |
| 6,263,365 B1 | 7/2001 | Scherpbier | |
| 6,295,551 B1 | 9/2001 | Roberts et al. | |
| 6,295,585 B1 * | 9/2001 | Gillett et al. | 711/148 |
| 6,301,258 B1 | 10/2001 | Katseff et al. | |
| 6,310,941 B1 | 10/2001 | Crutcher et al. | |
| 6,321,252 B1 * | 11/2001 | Bhola et al. | 709/204 |
| 6,335,927 B1 | 1/2002 | Elliott et al. | |
| 6,343,313 B1 | 1/2002 | Salesky et al. | |
| 6,411,988 B1 | 6/2002 | Tafoya et al. | |
| 6,463,585 B1 * | 10/2002 | Hendricks et al. | 725/35 |
| 6,519,660 B1 * | 2/2003 | Rooney | 710/38 |
| 6,542,936 B1 | 4/2003 | Mayle et al. | |
| 6,598,074 B1 | 7/2003 | Moller et al. | |
| 6,728,784 B1 | 4/2004 | Mattaway | |
| 6,748,447 B1 * | 6/2004 | Basani et al. | 709/244 |
| 6,785,244 B2 | 8/2004 | Roy | |
| 2001/0034752 A1 * | 10/2001 | Kremien | 709/105 |
| 2002/0031126 A1 * | 3/2002 | Crichton et al. | 370/394 |
| 2002/0056006 A1 * | 5/2002 | Vange et al. | 709/235 |
| 2002/0177910 A1 * | 11/2002 | Quarterman et al. | 700/28 |
| 2003/0093597 A1 * | 5/2003 | Marshak et al. | 710/52 |
| 2003/0229900 A1 * | 12/2003 | Reisman | 725/87 |
| 2005/0015471 A1 * | 1/2005 | Zhang et al. | 709/221 |
| 2005/0080850 A1 * | 4/2005 | Salesky et al. | 709/204 |

FOREIGN PATENT DOCUMENTS

| | | |
|---|---|---|
| EP | 0622931 A2 | 11/1994 |
| EP | 0874323 A1 | 10/1998 |
| EP | 0908824 A2 | 4/1999 |
| JP | 7049837 A | 2/1995 |
| JP | 11249995 A | 9/1999 |
| WO | WO 99/26153 A2 | 5/1999 |
| WO | WO 00/56050 A1 | 9/2000 |
| WO | WO 01/69418 A1 | 9/2001 |

OTHER PUBLICATIONS

Universal Internet Conference Information System, H. Abdel-Wahab, I. Stoica, F. Sultan Informatics and Computer Science 1996.

Jacobs, S., et al., "Filling HTML Forms Simultaneously: CoWeb-Architecture and Functionality," Computer Networks and ISDN Systems 28(11): 1385-1395 (1996).

Moralee D., "Scientific Graphics and Visualization Come to the Internet", Scientific Computing World, Mar. 1, 1995, p. 31, 33/34, 36 XP000571217 *p. 34, '2: The Internet carries videoconferencing Mice across Europe*.

Hao MC et al, "Collaborative Computing: A Multi-Client Multi-Server Environment", Conference on Organizational Computing Systems, Milpitas, CA, Aug. 123-16, 1995 Comstock N; Ellis C (EDS) pp. 206-213, XP000620968.

Proceedings of the Conference on Emerging Technologies and Applications vol. 1 1996 pp. 60-63. Vetter, RJ; Junalacada, C. "A Multimedia System for Asynchronous Collaboration".

"Interactive Remote Recording and Playback of Multicast Video Conferences" W. Holfelder (1998).

* cited by examiner

SYSTEMS AND METHODS FOR SYNCHRONIZING DATA BETWEEN COMMUNICATION DEVICES IN A NETWORKED ENVIRONMENT

BACKGROUND

1. Field of the Invention

The field of the invention relates generally to network communications and more particularly to synchronizing data shared between a plurality of networked communication devices.

2. Background Information

Networked communication devices often need to share information. For example, the need often arises in networked environments where data on one device needs to be replicated on one or more other devices. It will be understood that even the simple task of sharing data can be problematic in a networked environment; however, problems are further complicated when the data to be shared is dynamic or changing over time in such a way that only the latest set of data is of value. Various approaches exist for accomplishing the replication of dynamic data in a networked environment; however, conventional approaches are limited and often ineffective.

One conventional approach to sharing data in a networked environment uses repositories of data known as buffers on each of the devices. The buffers can then be synchronized by sending messages over a network connection. In order to reduce the amount of data sent and thus the usage of network connection bandwidth, an entire copy of the original, or source buffer, can be sent to one or more destination buffers. Thereafter, only changes in the source buffer are sent at various intervals. The destination device can then apply the changes to its local buffer to maintain synchronization with the source buffer. This approach allows the update interval to be selected to match the desired, or available network bandwidth between the source and receiving device. Selecting the update interval, however, can be problematic.

For example, updates can be sent to a destination device anytime a change is made to the buffer on the source device. But this can be ineffective because the destination device or interconnecting network link may be incapable of accepting and processing the updates at the rate changes occur at the source device. Accordingly, updates must either be discarded, resulting in loss of synchronization, or queued-up, in which case a lag develops between source and destination devices corresponding to the length of the queue. Such loss of synchronization or lag between destination and source devices can lead to problems. Moreover, queues may also consume significant and potentially unbounded resources, leading to further problems.

Alternatively, updates can be sent when requested by the destination device. This allows updates to be sent at a rate that they can be processed, but the receiving buffer is only synchronized with the source buffer at times when an update is sent. Thus, the source buffer may go through several intermediate states in the interval between updates. These intermediate states will not be reflected in the destination buffer.

A further drawback to conventional approaches can occur when a plurality of destination buffers must be synchronized with a source buffer. Often the data handling capability of each destination differs. Further, the network connections between source and each of the destination devices are not necessarily identical in terms of bandwidth, speed, latency, or reliability. As a result, changes sent to the destination devices can be sent only as frequently as can be handled by the slowest connected device or network connection. Accordingly, devices capable of receiving more information or more intermediate states are not able to operate using their full capability.

For example, a multimedia collaboration session, where a user's computer display, or region of the display, is shared with remote viewers, can be used to illustrate the problems with conventional data sharing approaches. The portion of the display to be shared is often captured in a buffer and transmitted to other viewers' computers. As the display changes, the source buffer is updated and updates are sent to destination buffers and displayed on viewers' displays; however, these updates are sent only at the rate corresponding to the slowest of all the connected networks and devices. Accordingly, even users with fast computers will experience less frequent updates and unpleasant artifacts such as jerkiness, low frame rate, and poor quality in displays involving changes or motion.

Alternatively, a separate instance of the source buffer can be maintained for each destination device and separate computation of changes. And update message transmission can be performed for each connected destination device. This technique allows each device to receive updates at a rate that best uses available network and device capabilities; however, this approach suffers from a limitation in that maintaining buffers and computing changes requires large amounts of memory and processing power. Thus, maintaining a separate buffer instance for each connected destination limits the number of endpoints that can be simultaneously connected. This is a serious limitation in a system such as a multimedia collaboration system, which may be of use only if a certain number of parties are able to connect.

Thus, a significant implementation challenge exists in synchronizing multiple destination buffers and devices to a source buffer containing data that changes over time. This is especially true when the data handling capacity of connected destination devices are not equal, as is typical in conventional networked environments. If all destinations devices are sent updates for every change in the source buffer, the volume of data may overwhelm the capacity of some devices and network links, resulting in loss of synchronization for those devices. If data is sent at a rate compatible with all devices, i.e. sent at the rate of the slowest receiving device and network link, devices with greater capability will receive poor quality data. If a separate data stream is created for each connected device, the resources of the sending device may become taxed and the result will be a limit to the number of destination devices that can connect simultaneously.

SUMMARY OF THE INVENTION

A source communication device comprises a cluster manager to group destination device connections into a plurality of performance clusters. The cluster manager can then assign a synchronization mechanism to each performance cluster. Each synchronization mechanism can then allow data to be optimally shared between the source device and destination devices within a given performance cluster.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Figure 1:
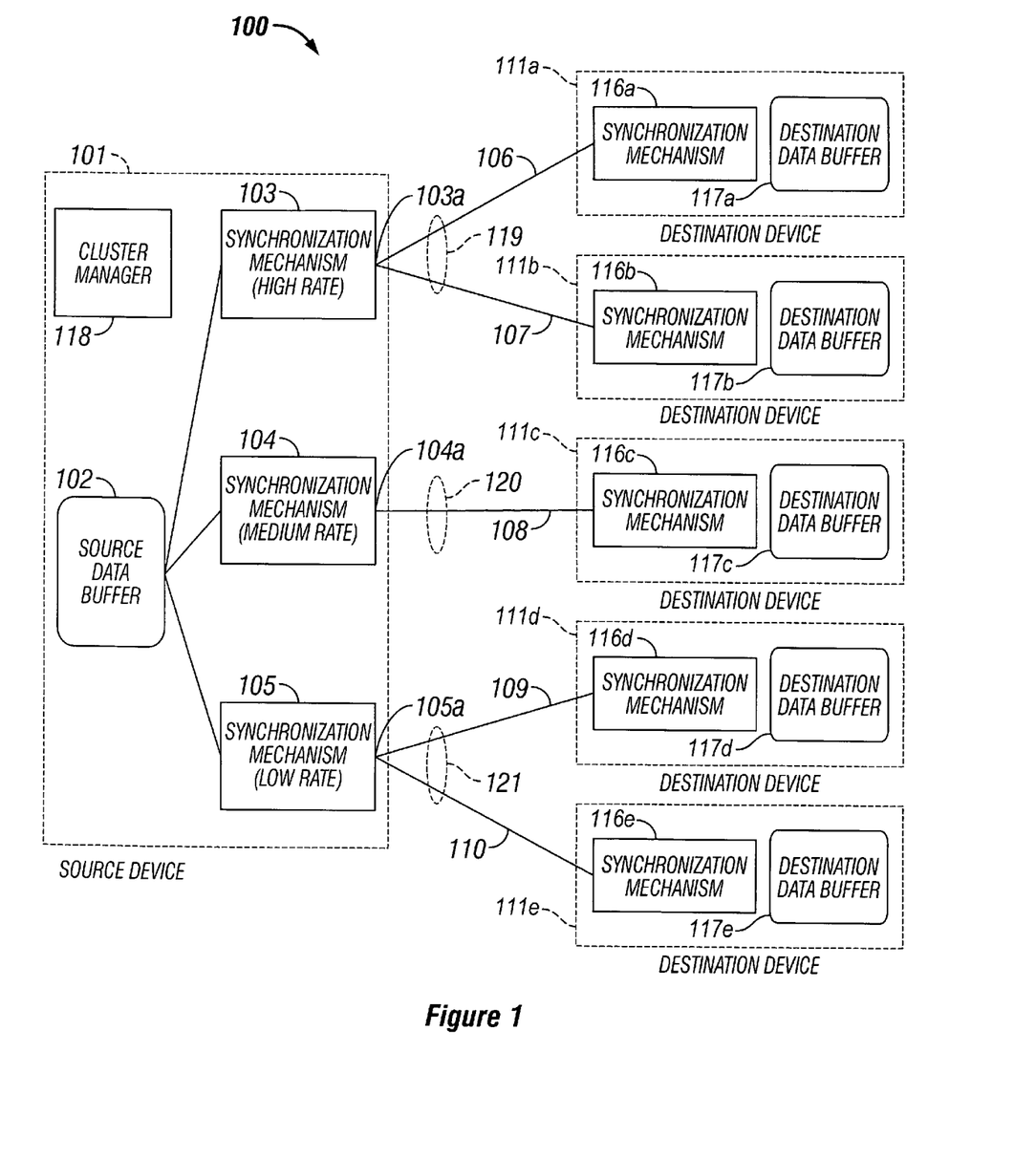
FIG. 1 is a diagram illustrating an example network communication system configured in accordance with one embodiment.

FIG. 1 is a diagram illustrating an example network communication system 100 configured in accordance with one embodiment of the systems and methods described herein. Network communication system 100 comprises a source device 101 interfaced with a plurality of destination devices 111a, 111b, 111c, 111d and 111e via connection interfaces 103a, 104a, and 105a and communication connections 106-110. Source device 101 comprises a source data buffer 102 that comprises data to be replicated on each destination device 111a-111e, e.g., in an associated destination data buffer 117a, 117b, 117c, 117d and 117e. Source device 101 can also include one or more synchronization mechanisms, such as synchronization mechanisms 103, 104, and 105, as well as a cluster manager 118. The source data buffer 102 can be coupled directly or indirectly to synchronization mechanisms 103, 104 and 105.

The number of destination devices 111a-111e and the number of associated communication connections are shown for illustration only. Only a small number of connections and destination devices 111a-111e are shown for clarity and should in no way imply a limit or suggestion as to the number of communication devices 111a-111e that can be supported using the systems and methods described herein.

The number of destination devices 111 and the number of associated communication connections are shown for illustration only. Only a small number of connections and destination devices 111 are shown for clarity and should in no way imply a limit or suggestion as to the number of communication devices 111 that can be supported using the systems and methods described herein.

Often, communication connections 106-110 can have different performance capabilities. As described below, performance capability can be defined in a variety of ways, such as the bandwidth capability of each connection. Thus for example, connections 106 and 107 can have a relatively high bandwidth capability, while connection 108 can have a somewhat lower bandwidth capability and connections 109 and 110 can have a still lower bandwidth capability. Accordingly, cluster manager 118 can be configured to group destination devices 111a-111e, or communication links 106-110, into performance clusters, e.g., performance clusters 119, 120, and 121, based on their similar performance capabilities. In FIG. 1, performance cluster 119 is shown as a high rate or high performance cluster; performance cluster 120 as shown as a medium rate or intermediate performance cluster; and performance cluster 121 is shown as a low rate system requirements dictate. The cluster manager can be further configured to assign a synchronization mechanism 103, 104, or 105 to each of the performance clusters 119, 120, and 121.

Synchronization mechanisms 103, 104, or 105 can be configured to then send updates to associated destination devices 111a-111e or associated communication links 106-110 in a manner that is optimized for the performance capabilities of the associated destination devices or communication links 106-110.

Source device 101 can be configured to share data stored in the source data buffer 102 with the plurality of destination devices 111a-111e. Communication connections 106-110 provide mechanisms for transferring data, i.e., physical communications channels, while the synchronization mechanisms 103-105 and corresponding synchronization mechanisms 116a, 116b, 116c, 116d and 116e associated with destination devices 111a-111e can be configured to provide the computation and protocols needed to share data between source data buffer 102 and destination data buffers 117a-117e over communication connections 106-110.

Figure 2:
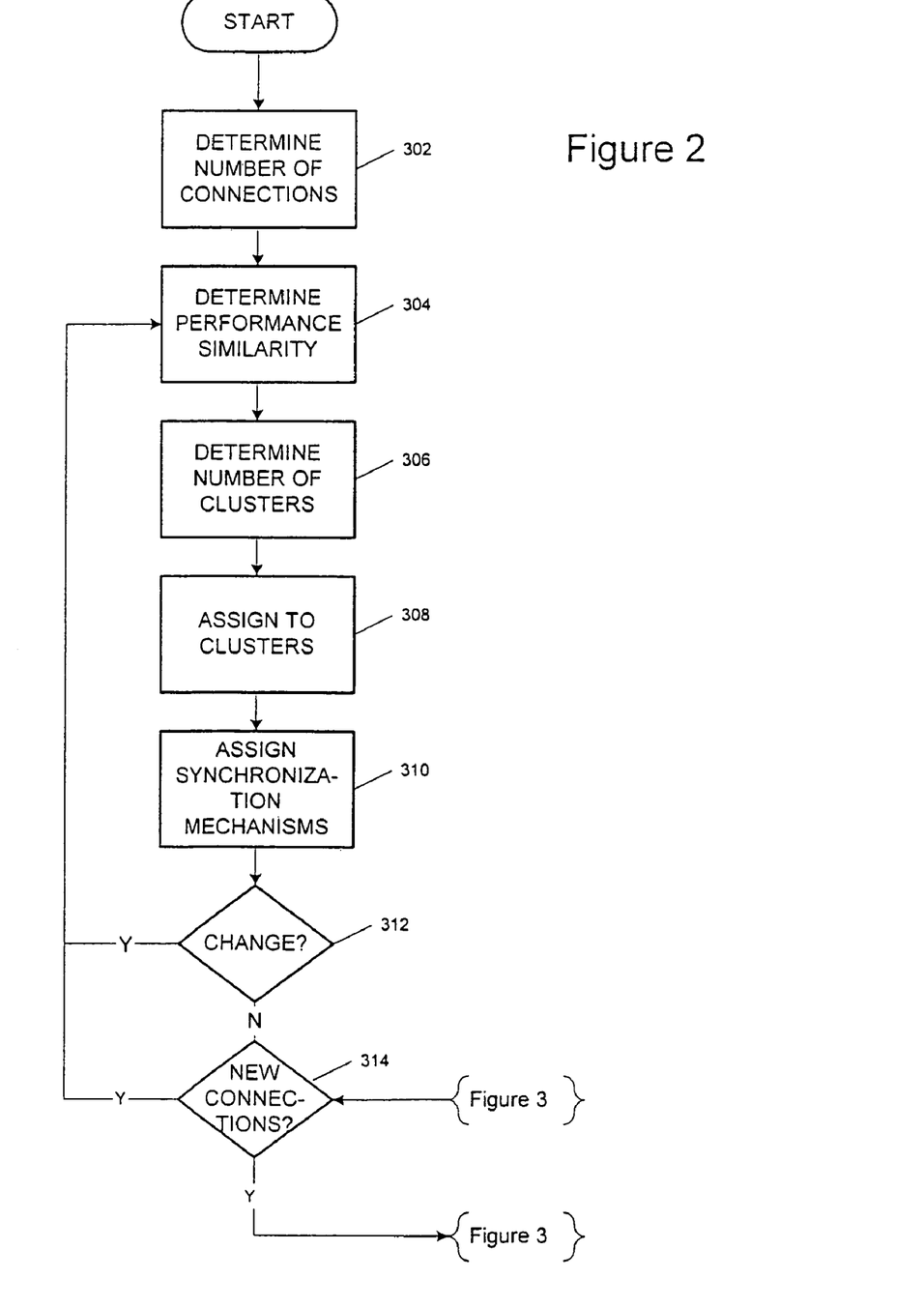
FIG. 2 is a diagram illustrating another example embodiment of a network communication system configured in accordance with one embodiment.

FIG. 2 is a diagram illustrating an example method for generating performance clusters, such as performance clusters 119, 120, and 121, in accordance with one embodiment of the systems and methods described herein. In step 302, the number of communication connections can be determined, e.g., by cluster manager 118. Cluster manager 118 can be configured to then determine, in step 304, the similarity in the performance capabilities of the communication connections. Based on the similarity determined in step 304, cluster manager can be configured to determine a required number of performance clusters in step 306. Cluster manager 118 can be configured to then cause the required number of synchronization mechanisms to be generated, in step 308 and then assign each communication connection to the appropriate performance cluster in step 310.

In one embodiment, the similarity in performance capability of the various communication connections is determined, in step 304, by maintaining statistics for data rate capability of each communication connection. Such statistics can be derived, for example, from observing data transfers between source device 101 and destination devices 111a-111e. In another embodiment, connection security associated with each of the communication connections 106-110 can be used to determine similar performance capabilities in step 304. In still another embodiment, the error rate associated with data transfer of each communication connection can be used in step 304. In yet another embodiment, latency associated with data transfer of each communication connection can be used in step 304. In fact, it will be understood that a variety of performance parameters and related information can be used to determine the similarity in the performance capabilities of the various communication connections. Thus, nothing within the specification or the claims that follow should be seen as limiting the systems and methods described herein to the use of any particular parameters or set of parameters.

In one embodiment, the number of synchronization mechanisms can be determined dynamically and can change as needed to accommodate destination devices 111a-111e as they connect with source device 101. Several algorithms can be used in selecting the number of synchronization mechanisms, some of which are described below. This dynamic capability can allow for a trade off between improved client service, which results when there are fewer destination devices 111a-111e per cluster, and reduced server resource usage, which results from having a large amount of clusters. Thus, for example, if there are only a few destination devices 111a-111e, or if client service is important, then cluster manager can assign, for example, each destination device 111 to its own synchronization mechanism. On the other hand, if there are a lot of destination devices 111a-111e, or if client service is not as important, then cluster manager can assign fewer synchronization mechanisms. Moreover, depending on the embodiment, cluster manager 118 can be configured to dynamically update the destination device groupings and add or remove synchronization mechanisms as required.

Further, in one particular embodiment, the correspondence between a destination device 111*a*-111*e* and a particular synchronization mechanism 103, 104, or 105 can also be dynamic. In other words, the corresponding communication connection for a particular destination device 111*a*-111*e* can be moved to a different synchronization mechanism if the corresponding performance capabilities change such that a different performance cluster 119, 120, or 121 is more appropriate. Thus, for example, cluster manager 118 can be configured to monitor, in step 312, a set of statistics associated with the performance of each communication connection 106-110 and to detect any change therein. If a significant change is detected, then the statistics can be used to determine if another performance cluster 119, 120, or 121 is more appropriate for the particular destination device 111*a*-111*e*.

In one embodiment, all connections 106-110 or all destination devices 111*a*-111*e* begin a session as part of a primary performance cluster. After a small number of updates the average latency for each destination device 111*a*-111*e* or communication connection 106-110 is gathered. Cluster manager 118 can be configured to then perform a cluster division (step 306) to organize destination devices 111*a*-111*e* according to their performance levels, e.g., their average latencies. For example, an initial calculation of the average latencies for each of the plurality of connections can be performed and used to determine the mean latency for the primary performance cluster. A standard deviation relative to the mean can also be calculated. The number of performance clusters required can then be determined based on the percentage of communication connections 106-110 with latencies within a certain number of standard deviations from the mean.

In one particular embodiment, a minimum standard deviation threshold can be used in order to prevent the creation of extra clusters when the performance level is very similar.

Further, in one embodiment, communication connections 106-110 can be placed into an appropriate performance cluster (step 308) using an algorithm, such as the K-means algorithm. The K-means algorithm is a partitioning method based on minimizing the sum-of-squares distance between average latencies for each communication connection 106-110 and the mean latency for the primary performance cluster, allowing division of communication connections 106-110 into (K) performance clusters. This is an iterative approach that maximizes the ratio of variation between performance clusters relative to the variation within a performance cluster. This approach allows a quick calculation with a resulting distinct separation of performance levels. Depending on the embodiment, the K-means algorithm is executed periodically or as needed, e.g., if there is a change in performance capabilities (step 312) or a new destination device 111*a*-111*e* joins the session (step 314).

In step 314, the cluster manager 118 can monitor the communication connections 106-110 to detect new connection, i.e., a communication connection that is established after a session has begun. The cluster manager 118 can determine the performance capabilities of the new connection and add the new connection to a performance cluster based upon the performance capabilities of the new connection. In one embodiment, such communication connections will be inserted into a performance cluster (step 308) without moving other communication connections at least until some initial lag statistics are computed for the new communication connection. The new communication connection can, for example, then be moved into a performance cluster based on, e.g., a least squares analysis.

A new insertion into a performance cluster can require a resynchronization for destination devices 111*a*-111*e* within the performance cluster on the next cluster-wide update. In one embodiment, only the newly added destination device 111*a*-111*e* need be resynchronized while the other destination devices 111*a*-111*e* remain synchronized.

Figure 3:
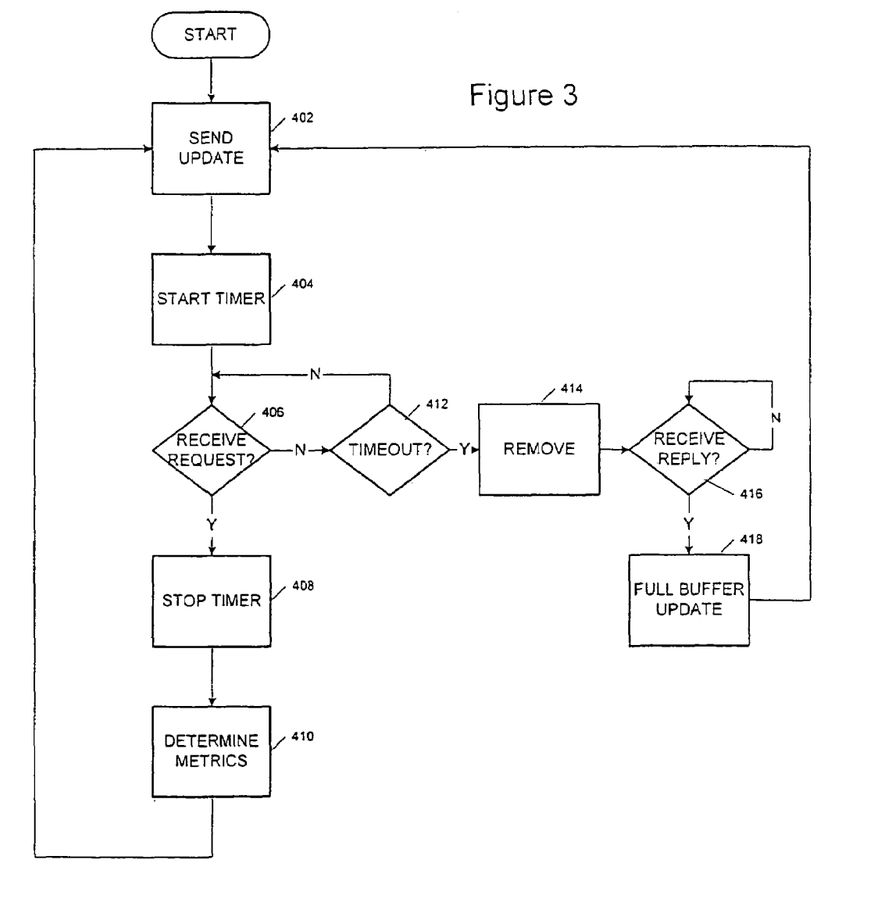
FIG. 3 is a flow chart illustrating an example method for configuring performance clusters within a source device included in the network communication system of FIG. 1 in accordance with one embodiment.

FIG. 3 is a flow chart illustrating an exemplary method for updating destination data buffers 117*a*-117*e* associated with a particular performance cluster 119-121 in accordance with one embodiment of the systems and methods described herein. Thus, in step 402, an update can be sent using a synchronization mechanism 103, 104, or 105. When the update is sent in step 402, a timer can then be started, in step 404, In step 406, the associated communication connections are monitored until one of the associated destination devices, requests another update. When another request is received the timer is stopped in step 408. The timer value can then be used to determine the latency associated with the communication connection for the requesting destination device 111*a*-111*e*. For each destination device 111*a*-111*e* two metrics can be determined and maintained in step 410. The two metrics can include a "Total Session Average Latency" and a "Recent Average Latency." The "Total Session Latency" can be an average of all latency values associated with the requesting destination device 111*a*-111*e*. The "Recent Average Latency" can be an average of some number of the most recent latency values for the requesting destination device 111*a*-111*e*.

A destination device 111*a*-111*e* that does not respond within a timeout threshold, as determined in step 412, can be removed from its performance cluster, in step 414, so that other destination devices 111*a*-111*e* in the performance cluster can still receive updates. This can, for example, prevent a network interruption or an issue associated with a destination device 111*a*-111*e* from harming the other cluster participants' experiences. If a destination device 111 has reached this timeout, in step 412, but eventually responds, in step 416, then it can still be allowed to receive full-buffer updates, in step 418, e.g., until its Recent Average Latency performance merits insertion back into one of the performance clusters 119-121.

In one embodiment, the synchronization mechanisms 103-105 and the synchronization mechanisms 116*a*-116*e* can be configured to operate by dividing the data in source data buffer 102 into a number of blocks or sections. Initially, or whenever synchronization is lost, a complete set of all blocks can be sent from source device 101 to a destination device 111*a*-111*e*. The associated destination device buffer 117*a*-117*e* can then be updated using the complete set of blocks so that it is a replica of the source data buffer 102. Subsequently source device 101 can send only blocks that have changed subsequent to the last update sent to the destination data buffer 117*a*-117*e*. This approach can, for example, result in considerable savings in network bandwidth.

In one embodiment, updates are sent when all connected devices in a cluster have requested an update.

Figure 4:
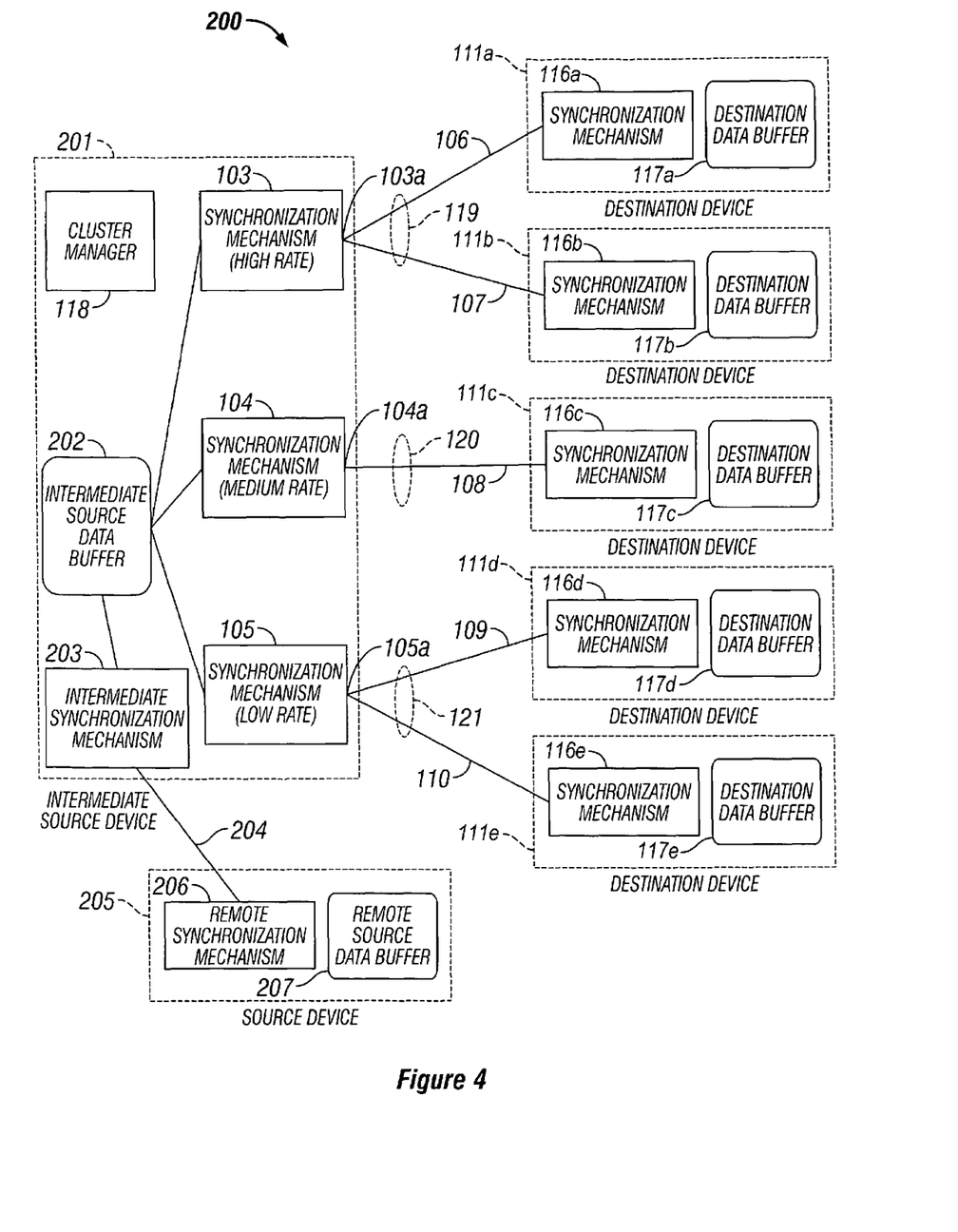
FIG. 4 is a flow chart illustrating an example method for synchronously sharing data using performance clusters established using the method of FIG. 3 in accordance with one embodiment.

It should be noted that the original source data buffer can be located on a remote source device, e.g., a device that is not immediately connected with destination devices 111*a*-111*e*. For example, FIG. 4 is a diagram illustrating an example network communication system 200, which comprises a remote source device 205, with remote source data buffer 207, in accordance with one embodiment of the systems and methods described herein. Remote source device 205 can be interfaced with destination devices 111a-111e via an intermediate source device 201. Thus, intermediate source device 201 can comprise a cluster manager 118, which can be configured to group communication connections 106-110 into performance clusters 119-121 using synchronization mechanisms 103-105.

In addition, intermediate source device 201 can comprise an intermediate source data buffer 202, which can be kept in synchronization with remote source data buffer 207 using synchronization mechanisms 203 and 205. Destination data buffers 117a-117e can then be kept in synchronization with intermediate source data buffer 202 as described above in relation to source data buffer 102.

In one example of FIG. 4, synchronization mechanism 103 can be configured to provide updates to performance cluster 119, which comprises the highest data rate destination devices 111a-111e and communication connections 106 and 107. The update interval required by synchronization mechanism 103 can thus determine the highest update rate needed and can therefore also serve as the update interval used by synchronization mechanisms 203 and 205 for updating intermediate source data buffer 202. This approach can be used to avoid redundant or excessive data requests for communication connection 204.

What is claimed:

1. A method for sharing and synchronizing data between a source device and a plurality of destination devices in a network communication system, the method comprising:
   determining performance similarities for a plurality of communication connections, each communication connection connecting the source device and at least one of the plurality of destination devices;
   creating, dynamically, one or more performance clusters based on performance similarities;
   assigning each of the plurality of communication connections into one of the performance clusters based on the determined performance similarities; and
   assigning a synchronization mechanism to each of the performance clusters, wherein each synchronization mechanism is coupled with a source data buffer in the source device, the source data buffer containing the data to be shared with each destination device wherein a destination device that does not respond within a timeout threshold is removed from its performance cluster but when the removed destination device responds to the timeout threshold it receives full-buffer updates until such point as a recent average latency performance of the responding destination device is at a level that merits insertion back into one of the performance clusters.

2. The method of claim 1, wherein determining the performance similarities for the plurality of communication connections comprises determining the bandwidth capabilities for each of the plurality of communication connections.

3. The method of claim 1, wherein determining the performance similarities for the plurality of communication connections comprises determining the latency associated with each of the plurality of communication connections.

4. The method of claim 1, wherein determining the performance similarities for the plurality of communication connections comprises determining connection security associated with each of the plurality of communication connections.

5. The method of claim 1, wherein determining the performance similarities for the plurality of communication connections comprises determining an error rate associated with each of the plurality of communication connections.

6. The method of claim 1, further comprising detecting a change in performance capabilities for one of the plurality of communication connections and assigning the communication connection to another performance cluster based on the performance capabilities subsequent to the change.

7. The method of claim 1, further comprising detecting a new communication connection, determining performance capabilities of the new communication connection, and adding the new communication connection to a performance cluster based on the performance capabilities of the new communication connection.

8. The method of claim 1, further comprising replicating the entire source data buffer on each of the plurality of destination devices and then updating the destination devices only when data in the source data buffer has changed.

9. The method of claim 1, further comprising replicating the entire source data buffer on each of the plurality of destination devices assigned to a performance cluster, and then updating such destination devices when at least one of the destination devices assigned to a performance cluster requests an update.

10. The method of claim 1, further comprising replicating the entire source data buffer on the each of the plurality of destination devices assigned to a performance cluster, and updating such destination devices when all such destination devices have requested an update.

11. The method of claim 1, wherein determining the performance similarities for each of the plurality of communication connections comprises:
   assigning all of the plurality of communication connections to a primary performance cluster; and
   gathering an average latency for each of the plurality of communication connections.

12. The method of claim 11, further comprising assigning the plurality of communication connections into the performance clusters based on the average latency of each of the plurality of communication connections.

13. The method of claim 12, wherein assigning the plurality of communication connections into the performance clusters further comprises:
   determining a mean latency for the primary performance cluster based on the average latencies for each of the plurality of communication connections;
   determining a standard deviation of the average latency for each of the plurality of communication connections; relative to the mean latency for the primary performance cluster; and
   determining the number of performance clusters required based on the mean latency for the primary performance cluster and standard deviation of the average latency of each of the plurality of communication connections.

14. The method of claim 1, wherein assigning the plurality of communication connections into performance clusters further comprises assigning the communication connections using a sum-of-squares determination.

15. A source device in communication with a plurality of destination devices in a collaborative communication session, each destination device in communication with the source device via an associated communication connections such that data in the source device can be shared with each destination device in a timely manner, the source device comprising:
   a cluster manager configured to:
      determine connection characteristics for each of the plurality of destination devices and associated communication connections, dynamically create one or more performance clusters based on the determined connection characteristics, and assign each of the communication connections to one of the created performance clusters based on performance similarities of the determined connection characteristics of the destination devices and associated communication connections assigned to each performance cluster;

a source data buffer containing the data to be shared with each of the plurality of destination devices; and a plurality of synchronization mechanisms coupled with the source data buffer, each of the plurality of synchronization mechanisms corresponding to one of the performance clusters, wherein each of said synchronization mechanisms is coupled with the source data buffer thereby synchronizing for each performance cluster the data sent to the destination devices associated with communication connections assigned to said performance cluster wherein a destination device that does not respond within a timeout threshold is removed from its performance cluster but when the removed destination device responds to the timeout threshold it receives full-buffer updates until such point as a recent average latency performance of the responding destination device is at a level that merits insertion back into one of the performance clusters.

16. The source device of claim 15, wherein the cluster manager is further configured to assign a synchronization mechanism to each of the performance clusters.

17. The source device of claim 16, wherein at least one of the plurality of synchronization mechanisms is further configured to replicate the entire source data buffer on each of the destination devices assigned to the synchronization mechanism performance cluster and then update the destination devices only when the data in the source data buffer has changed.

18. The source device of claim 16, wherein at least one of the plurality of synchronization mechanisms is further configured to replicate the entire source data buffer on each of the destination devices assigned to the synchronization mechanism performance cluster and then update the destination devices only when at least one of such destination devices requests an update.

19. The source device of claim 16, wherein at least one of the plurality of synchronization mechanisms is further configured to replicate the entire source data buffer on each of the destination devices assigned to the synchronization mechanism performance cluster, and wherein each of the plurality of synchronization mechanisms is further configured to update the destination devices interfaced with the synchronization mechanism only when all such destination devices have requested an update.

20. The source device of claim 15, wherein each of the plurality of synchronization mechanisms is configured to provide computations and protocols needed to communicate the data from the source device to each destination device over the plurality of communication connections.

21. The source device of claim 15, wherein the performance clusters include a high performance cluster.

22. The source device of claim 15, wherein the performance clusters include an intermediate performance cluster.

23. The source device of claim 15, wherein the performance clusters include a low performance cluster.

24. The source device of claim 15, wherein at least one of the performance similarities for the plurality of communication connections is determined based on the bandwidth capability of each of the plurality of communication connections.

25. The source device of claim 15, wherein at least one of the performance similarities for the plurality of communication connections is determined based on the latency of each of the plurality of communication connections.

26. The source device of claim 15, wherein at least one of the performance similarities is determined based on the connection security of each of the plurality of communication connections.

27. The source device of claim 15, wherein at least one of the performance similarities is determined based on the error rate of each of the plurality of communication connections.

28. The source device of claim 15, wherein the cluster manager is further configured to detect a change in connection characteristics for any of the plurality of communication connections and to assign the communication connection to one of the performance clusters based on the changed connection characteristics.

29. The source device of claim 15, wherein the cluster manager is further configured to detect a new communication connection, determine the performance capabilities of the new communication connection, and add the new communication connection to one of the performance clusters based on the performance capabilities of the new communication connection.

30. The source device of claim 15, wherein the performance similarities for the plurality of communication connections are determined through the steps of:
    assigning all of the plurality of communication connections to a primary performance cluster; and
    gathering an average latency for each of the plurality of communication connections.

31. The source device of claim 30, wherein the cluster manager is further configured to assign the plurality of communication connections into each of the performance clusters based on the average latency of each of the plurality of communication connections.

32. The source device of claim 30, wherein the plurality of communication connections are assigned into the performance clusters through the steps of:
    determining time-average latencies for each of the plurality of communication connections;
    determining a primary cluster mean latency for the primary performance cluster based on the time-average latencies for each of the plurality of communication connections assigned to the primary cluster;
    determining the standard deviation of the time-average latencies for each of the plurality of communication connections relative to the primary cluster mean latency; and
    determining the number of performance clusters required based on the primary cluster mean latency and the standard deviations of the time-average latencies for each of the plurality of communication connections.

33. The source device of claim 32, wherein the plurality of communication connections are assigned into the performance clusters through further steps of:
    (a) creating a number of performance clusters;
    (b) assigning each of the communication connections to one of the performance clusters;
    (c) calculating the cluster mean latency for each performance cluster based on the time-average latency of each of the connections assigned to the performance cluster;
    (d) repeating step (c) for all the of the created performance clusters;
    (e) assigning each communication connection to the performance cluster wherein the cluster mean latency is closest to the connection time-average latency; and (f) repeating steps (c), (d) and (e) until no change in cluster assignment occurs in step (e).

34. The source device of claim 1, wherein the cluster manager is further configured to determine the number of performance clusters to be created and synchronization mechanisms to be assigned by applying a pre-determined function, the function comprising:
   a source device resource priority corresponding to the relative importance of minimizing resource usage on the source device; and
   a destination device service priority corresponding to the relative importance of providing timely updates to the plurality of connected destination devices.

35. The source device of claim 34, wherein the cluster manager is further configured to determine the number of the performance clusters and synchronization mechanisms by selecting the minimum of:
   the maximum number corresponding to the resources available on the source device;
   a number corresponding to a pre-determined percentage of available source device resources;
   the minimum number that provides timely updates to all of the plurality of destination devices; and
   a pre-defined limit number.

36. The source device of claim 34, wherein the cluster manager is further configured to increase the number of performance clusters if the destination device service priority is higher than the source device resource priority, and decrease the number of performance clusters if the destination device service priority is lower than the source device resource priority.

37. The source device of claim 1, wherein each of the performance clusters is pre-defined to be associated with a subset of communication connections having similar performance capabilities.

38. The source device of claim 1, wherein the data in the source data buffer comprises audio and video data in the collaborative communication session.

39. The source device of claim 1, wherein the data in the source data buffer comprises image data shared in the collaborative communication session.

40. The source device of claim 39, wherein the image data represents a region displayed on a computer screen, wherein said region and said shared image data are updated at least once while being shared.

41. The source device of claim 1, wherein the sharing of data in the source data buffer with the destination devices provides a display sharing function in the collaborative communication session.

42. A network communication system for facilitating data synchronization in a collaborative web session, the system comprising:
   a source device configured to communicate with a plurality of destination devices, each via one of a plurality of communication connections, wherein each destination device has a destination synchronization mechanism and a destination data buffer, the source device comprising:
      a cluster manager configured to determine performance similarities for the plurality of communication connections and to assign each of the plurality of communication connections into one of pre-defined performance clusters based on the determined performance similarities, and wherein the cluster manager is further configured to dynamically create performance clusters as system requirements dictate;
      a source data buffer containing data to be shared with each destination data buffer of each of the plurality of the destination devices; and
      a plurality of source synchronization mechanisms coupled with the source data buffer, further coupled with the plurality of communication connections, each of the plurality of source synchronization mechanisms corresponding to one of the performance clusters wherein a destination device that does not respond within a timeout threshold is removed from its performance cluster but when the removed destination device responds to the timeout threshold it receives full-buffer updates until such point as a recent average latency performance of the responding destination device is at a level that merits insertion back into one of the performance clusters.

43. The network communication system of claim 42, wherein the cluster manager is further configured to assign one of the plurality of source synchronization mechanisms to each of the performance clusters.

44. The network communication system of claim 43, wherein each of the plurality of source synchronization mechanisms and each of the destination synchronization mechanisms are configured to provide computations and protocols needed to communicate data over the plurality of communication connections.

45. The network communication system of claim 42, wherein some of the plurality of destination devices use high bandwidth connections with the source device, and wherein some of the performance clusters are high performance clusters configured to service the high bandwidth connections.

46. The network communication system of claim 42, wherein some of the plurality of destination devices use intermediate bandwidth connections with the source device, and wherein some of the performance clusters are intermediate performance clusters configured to service the intermediate bandwidth connections.

47. The network communication system of claim 42, wherein some of the plurality of destination devices use low bandwidth connections with the source device, and wherein some of the performance clusters are low performance clusters configured to service the low bandwidth connections.

48. The network communication system of claim 42, wherein the performance similarities for each of the plurality of communication connections are determined based on the bandwidth of each of the plurality of communication connections.

49. The network communication system of claim 42, wherein the performance similarities for the plurality of communication connections are determined based on the latency of each of the plurality of communication connections.

50. The network communication system of claim 42, wherein the performance similarities for the plurality of communication connections are determined based on the connection security of each of the plurality of communication connections.

51. The network communication system of claim 42, wherein the performance similarities for the plurality of communication connections are determined based on the error rate of each of the plurality of communication connections.

52. The network communication system of claim 42, wherein the cluster manager is further configured to detect a change in performance capabilities for one of the plurality of communication connections and to assign the communication connection to another performance cluster based on the performance capabilities subsequent to the change.

53. The network communication system of claim 42, wherein the cluster manager is further configured to detect a new communication connection, determine the performance capabilities of the new communication connection, and add the new communication connection to a performance cluster based on the performance capabilities of the new communication connection.

54. The network communication system of claim 42, wherein at least one of the plurality of synchronization mechanisms is further configured to replicate the entire source data buffer on each of the destination devices assigned to the synchronization mechanism performance cluster and then update the destination devices only when the data in the source data buffer has changed.

55. The network communication system of claim 42, wherein at least one of the plurality of synchronization mechanisms is further configured to replicate the entire source data buffer on each of the destination devices assigned to the synchronization mechanism performance cluster and then update the destination devices only when at least one of such destination devices requests an update.

56. The network communication system of claim 42, wherein at least one of the plurality of synchronization mechanisms is further configured to replicate the entire source data buffer on each of the destination devices assigned to the synchronization mechanism performance cluster, and wherein each of the plurality of synchronization mechanisms is further configured to update the destination devices interfaced with the synchronization mechanism only when all such destination devices have requested an update.

57. The network communication system of claim 42, wherein the performance similarities for the plurality of connections are determined through the steps of:
    assigning all of the plurality of communication connections to a primary performance cluster; and
    gathering an average latency for each of the plurality of communication connections.

58. The network communication system of claim 57, wherein the cluster manager is further configured to assign the plurality of communication connections into performance clusters based on the average latency of each of the plurality of communication connections.

59. The network communication system of claim 57, wherein the plurality of communication connections are assigned into performance clusters through the steps of:
    determining a mean latency for the primary performance cluster based on the average latencies for each of the plurality of communication connections;
    determining a standard deviation of the average latency for each of the plurality of communication connections relative to the mean latency for the primary performance cluster;
    determining the number of performance clusters required based on the mean latency and standard deviation.

60. The network communication system of claim 42, wherein the plurality of communication connections are assigned into performance clusters via a further step of assigning the communication connections using a sum-of-squares determination.

61. The network communication system of claim 42, wherein the cluster manager is further configured to determine the number of performance clusters to be created and synchronization mechanisms to be assigned by applying a pre-determined function, the function comprising:
    a source device resource priority corresponding to the relative importance of minimizing resource usage on the source device; and
    a destination device service priority corresponding to the relative importance of providing timely updates to the plurality of connected destination devices.

62. The network communication system of claim 61, wherein the cluster manager is further configured to increase the number of the performance clusters if the destination device service priority is higher than the source device resource priority, and decrease the number of the performance clusters if the destination device service priority is lower than the source device resource priority.

63. The network communication system of claim 42, further comprising a remote source device, the remote source device configured to communicate with the plurality of destination devices via the source device.

64. The network communication system of claim 63, wherein the remote source device comprises a remote source data buffer and a remote synchronization mechanism coupled with the remote source data buffer, the remote source data buffer containing data to be shared with the source buffer.

65. The network communication system of claim 64, wherein the source device further comprises an intermediate synchronization mechanism in communication with the remote synchronization mechanism via a remote communication connection.

66. The network communication system of claim 65, wherein both the intermediate synchronization mechanism and the remote synchronization mechanism are configured to provide computations and protocols needed to communicate data over the remote communication connection.

67. The network communication system of claim 66, wherein the remote synchronization mechanism is further configured to replicate the data in the remote source data buffer on the source data buffer so that the data will be shared with each of the plurality of destination devices via the plurality of synchronization mechanisms of the source device.

68. The network communication system of claim 67, wherein the data comprises audio and video data shared in the collaborative communication session.

69. The network communication system of claim 67, wherein the data comprises application data shared in the collaborative communication session.

70. The network communication system of claim 67, wherein the data comprises image data shared in the collaborative communication session, wherein the image data represents a region displayed in a computer screen.

71. The network communication system of claim 70, wherein said region and said image data are updated at least once while being shared.

72. A source device in communication with a plurality of destination devices in a collaborative communication session, each destination device in communication with the source device via an associated communication connection such that data in the source device can be shared with each destination device in a timely manner, the source device comprising:
    a cluster manager configured to determine connection characteristics for each of the plurality of destination devices and associated communication connections, further configured to create one or more performance clusters, and further configured to assign each of the plurality of communication connections into one of the created performance clusters based on performance similarities of the determined connection characteristics of the destination devices and associated communication connections assigned to each performance cluster;

the cluster manager further configured to vary the number of performance clusters based on a service priority level of the destination device and a resource priority level of the source device;

a source data buffer containing the data to be shared with each of the plurality of destination devices; and a plurality of synchronization mechanisms coupled with the source data buffer, each of the plurality of synchronization mechanisms corresponding to one of the performance clusters, wherein said synchronization mechanism is coupled with the source data buffer thereby synchronizing for each performance cluster the data sent to the destination devices associated with communication connections assigned to said performance cluster wherein a destination device that does not respond within a timeout threshold is removed from its performance cluster but when the removed destination device responds to the timeout threshold it receives full-buffer updates until such point as a recent average latency performance of the responding destination device is at a level that merits insertion back into one of the performance clusters.

* * * * *